United States Patent [19]

Nichols

[11] Patent Number: 4,743,455
[45] Date of Patent: May 10, 1988

[54] METHOD FOR MAKING POTATO CHIPS

[75] Inventor: David A. Nichols, 10916 Dakota Ct., Burnsville, Minn. 55337

[73] Assignees: David A. Nichols, Burnsville; William H. McCombs, Minneapolis; Gregory J. Frank, Maple Grove, all of Minn.

[21] Appl. No.: 946,814

[22] Filed: Dec. 29, 1986

[51] Int. Cl.$^4$ ............................................. A23L 1/217
[52] U.S. Cl. .................................... 426/233; 426/438; 426/441
[58] Field of Search ................ 426/233, 637, 438, 441

[56] References Cited

U.S. PATENT DOCUMENTS

| | | | |
|---|---|---|---|
| 3,044,880 | 7/1962 | Bogyo et al. | 426/438 X |
| 3,597,239 | 8/1971 | Vahlsing | 426/438 X |
| 3,729,323 | 4/1973 | Nonaka et al. | 426/441 |
| 3,934,046 | 1/1976 | Weaver et al. | 426/637 X |

*Primary Examiner*—Arthur L. Corbin
*Attorney, Agent, or Firm*—Merchant, Gould, Smith, Edell, Welter and Schmidt

[57] ABSTRACT

A process for blanching deep fat fried potato slices which does not significantly degrade the taste, texture, flavor and/or color of the deep fat fried potato products comprising the steps of contacting raw potato slices with water heated to about 150°–170° F. for about 0.5–3 minutes so as to remove sugar from the potato slices while retaining the structural integrity of substantially all starch cells present in the potato slices, and then cooling the potato slices to less than about 80° F. with microscopic monitoring to assure the integrity of substantially all starch cells present.

15 Claims, No Drawings

METHOD FOR MAKING POTATO CHIPS

FIELD OF THE INVENTION

Broadly, this invention relates to processing low-quality potatoes to provide high-quality potato chips. Specifically, this invention relates to the extraction of sugar from potato slices so as to produce quality potato chips therefrom.

BACKGROUND OF THE INVENTION

The manufacture of potato chips is a multi-step process which includes the steps of washing raw potatoes in order to remove dirt and blemishes therefrom, peeling the washed potatoes, slicing the potatoes to a thickness appropriate to prepare potato chips, washing the potato slices to remove excess surface starch therefrom, cooking the slices in heated oil until potato chips of the desired color and texture are obtained, and finally seasoning the potato chips.

A common problem encountered in the production of potato chips is the development of unappealing dark brown discoloration of some of the chips during cooking. It is well known that such discoloration results from excessive sugar in the potato slices. Several methods have been developed for blanching potato chips to extract sugar from the potato slices. However, all such prior methods have proven to be less than satisfactory as they result in significant alterations in the taste, texture, flavor, and/or color of the potato chips.

Accordingly, a substantial need exists for a method of reducing the sugar content of potato slices while avoiding significant degradation of the taste, texture, flavor and/or color of the finished potato chips.

SUMMARY OF THE INVENTION

I have discovered a process for blanching potato slices for making deep fat fried potato products which does not significantly degrade the taste, texture, flavor and/or color of the deep fat fried potato product.

Broadly, the process comprises the steps of contacting raw potato slices having a thickness of 0.05 to 0.075 inches with water heated to about 150°–170° F. for about 0.5–3 minutes so as to remove sugar from the potato slices while retaining the structural integrity of substantially all starch cells present in the potato slices, and then cooling the potato slices to less than about 80° F. Thereafter the slices are fried.

DETAILED DESCRIPTION OF THE INVENTION

I have found that discoloration of deep fat fried potato products is most strongly affected by the amount of sugar present in the raw potato (the greater the amount of sugar, the more likely and more intense the darkening). I have also found that the taste, texture, flavor and color of deep fat fried potato slices is most strongly affected by the amount of ruptured starch cells present in the raw potato prior to frying (the greater the number of ruptured starch cells the greater the effect upon the taste, texture, flavor and color of the deep fat fried potato product).

Unfortunately, conditions which favor the extraction of sugar from raw potatoes (i.e. high temperatures) also favor the rupture of the starch cells. I have discovered the critical conditions which allow sufficient sugar to be extracted from raw potato slices so as to produce coloration essentially equal to a non-blanched product while retaining the structural integrity of substantially all starch cells so as to maintain the original taste, texture, flavor and color of the deep fat fried potato product.

The temperature of the water and the duration of hot blanching should be sufficient to remove at least 50%, desirably 90%, of the sugar content of the slice, yet sufficiently limited to rupture less than 10%, desirably less than 5% and preferably 0% of the starch granules.

Broadly, my process comprises the steps of contacting potato slices with water heated to about 150°–170° F. for about 0.5–3 minutes so as to remove sugar from the potato slices while retaining the structural integrity of substantially all starch cells present in the potato slices, and then cooling the potato slices to less than about 80° F.

Preferably, the temperature of the heated water and the duration of contact between the heated water and the potato slices is correlated so as to extract the maximum amount of sugar from the potato slices while retaining the structural integrity of nearly all starch cells present in the potato slices. Sufficient sugar must be removed to provide acceptable color in the final fried chip. I have found that this typically results in the extraction of about 50–90 wt-% of the total surface sugar present in the potato slices. The term "surface sugar" as used herein means the sugar that is sufficiently close to the surface to affect the observed color of the fried chip.

It is, or course, possible to extract less sugar and thereby ensure retention of the original taste, texture, color and flavor of the potato chip, but, in accordance with the principles stated earlier, the color will suffer accordingly. Likewise, it is possible to extract more sugar and thereby avoid even minimal discoloration, but again, the taste, texture and flavor will suffer in accordance with the principles stated earlier.

The temperature of the heated water used to extract sugar from the potato slices must be between about 150°–170° F. A water temperature below about 150° F. results in slowed production due to the necessarily long duration of contact between the heated water and the potato slices in order to remove the desired amount of sugar. Further, a water temperature above about 170° F. also results in bland and rubbery potato chips since a significant number of starch cells are almost instantaneously ruptured upon contact of the potato slices with the heated water. The duration of contact between the potato slices and the heated water may be between about 0.5–5 minutes, preferably 0.5–3 minutes. I have found that if the duration of contact between the potato slices and the heated water is less than about 0.5 minutes, it is impossible to extract a meaningful amount of sugar from the potato slices without rupturing a significant number of starch cells. Further, I have found that if the duration of contact between the potato slices and the heated water is greater than about 3 minutes, the resultant potato chips have a bland and rubbery taste.

In order to achieve and maintain optimum removal of sugar without the rupture of a significant number of starch cells, it is desired to (i) periodically determine the number percent of starch cells ruptured by the heated water and reduce the temperature of the heated water and/or the duration of contact between the heated water and the potato slices accordingly, and (ii) periodically increasing the temperature of the heated water, determining the increase in the number of ruptured starch cells created by such increase, and incrementally increasing the temperature until an increase in the number of ruptured starch cells is noticed. A simple, inexpensive and accurate method of determining the number percent of starch cells ruptured during contact of the potato slices with the heated water is to simply magnify a thin slice of one of the potato slices after it exits the heated water and visually determine the number percent of ruptured starch cells therein. I have found that the determination of the number of ruptured starch cells about every 10 to 180 minutes, preferably about every 20 to 60 minutes, is an adequate compromise between quality control and cost. Of course, such a determination may be made as often as desired, but it must be remembered that a decrease in the number of such determinations results in an increase in the likelihood that the operating conditions and/or product will change so as to produce discolored or bland and rubbery potato chips.

A preferred method of determining the optimum sugar removal conditions for the heated water step is to (i) initially heat the water to a temperature of about 160° F. and a contact time of about 2 minutes, (ii) determine if any starch cells are ruptured by contact of potato slices with the heated water, (iii) if any ruptured starch cells are observed, continuously reduce the contact time by 5 seconds until no ruptured starch cells are seen and then reducing the contact time by an additional 5 seconds, (iv) if no ruptured starch cells are observed, continuously increase the water temperature by 1° F. until ruptured starch cells are seen and then reduce the water temperature by 2° F., and (v) if no ruptured cells are seen when the temperature reaches about 170° F., increase the contact time by about 15 seconds and repeat steps (ii)–(v).

After the sugar has been extracted from the potato slices by the heated water and before the potato slices are cooked in hot oil, the potato slices should be cooled to less than about 80° F. The potato slices may be cooled by cold water quenching. For reasons of low cost, effective rate of cooling, and the removal of additional sugar without the rupture of additional starch cells, the preferred method of cooling the potato slices is to quench the potato slices in water maintained at a temperature below about 80° F., preferably maintained at a temperature below about 50° F.

In both steps of the process, the preferred method of contacting the potato slices and the water is to immerse the potato slices into the water. I have found that a convenient method of contacting the potato slices in the water for the desired duration is to transport the potato slices through the water in a reel-type blancher with counter current or cross current water circulation, with the duration of the contact altered by changing the speed of the reel.

I have found that the process runs most efficiently and consistently if the concentration of dissolved solids in both the heated water and the cooling water is maintained below about 3 wt-%. A convenient way of assuring that the dissolved solids are maintained below this concentration is to simply continuously add an amount of fresh water and allow the excess created thereby to be drained off and removed. If desired, maintenance of the concentration of dissolved solids in the water may be monitored by utilizing a refractometer and opening and closing the fresh water valves for increasing or decreasing the amount of fresh water added.

EXAMPLE I

A reel-type hot blancher, manufactured by Lyco Manufacturing Company, having a bath temperature variance of ±1° F. and capable of maintaining potato slices immersed in a hot water bath for between 0.5–5 minutes, is filled with hot water, set at a bath temperature of 160° F., and set at an immersion time of 2 minutes.

A reel-type cold blancher having the same capabilities as the hot blancher is filled with cold water, set at a bath temperature of 50° F., and set at an immersion time of 1.5 minutes.

Both blanchers are fed sufficient fresh water so as to maintain the solids content of the water bath below about 3 wt-%.

Sliced potatoes are then conveyed first through the hot blancher and then through the cold blancher.

A thin slice is taken from one of the potato slices after it emerges from the hot blancher and visually examined under a microscope set at 40 power. The number percent of starch cells ruptured by the hot blancher is visually determined. If no ruptured starch cells are present, the water temperature is increased in 1° F. increments and visual examination repeated until ruptured starch cells are observed. If ruptured starch cells are present, the water temperature is decreased in 1° F. increments and visual examination repeated until no ruptured starch cells are observed. The temperature of the water in the hot blancher is then reduced by 2° F.

In order to maintain optimum conditions, every 30 minutes a potato slice is examined immediately upon its emergence from the first blancher and the temperature of the hot water bath and/or the duration of immersion decreased if ruptured starch cells are noticed.

In order to further maintain optimum conditions, every 8 hours the temperature of the water in the hot blancher is increased in 1° F. increments until ruptured starch cells are observed and the temperature of the water bath then reduced by 2° F.

EXAMPLE II

Blanched potato chips were made in accordance with both the preferred process of the present invention and the conventional process presently used by most processors. The process variables and results obtained are set forth in the following Table I.

TABLE I

| Sample No. | Type of Potato | Hot Blancher | | Cold Blancher | | Cooking Oil | |
|---|---|---|---|---|---|---|---|
| | | Immersion Time (Min) | Water Temp (°F.) | Immersion Time (Min) | Water Temp (°F.) | Immersion Time (Sec) | Oil Temp (°F.) |
| 1 | Norchip stored at 7° C. High Sugar | — | — | — | — | 78 | 358 |
| 2 | Norchip stored at 7° C. High Sugar | 1.0 | 158 | — | — | 90 | 358 |
| 3 | Norchip stored at 7° C. High Sugar | 2.5 | 157 | 1.0 | 44 | 78 | 358 |

TABLE I-continued

| Sample No. | Type of Potato | Hot Blancher | | Cold Blancher | | Cooking Oil | |
|---|---|---|---|---|---|---|---|
| | | Immersion Time (Min) | Water Temp (°F.) | Immersion Time (Min) | Water Temp (°F.) | Immersion Time (Sec) | Oil Temp (°F.) |
| 4 | Norchip stored at 7° C. High Sugar | 2.5 | 157 | 0.5 | 44 | 85 | 358 |
| 5 | Norchip stored at 11° C. Low Sugar- Excellent Quality | — | — | — | — | 90 | 360 |

Sample 1 was a potato chip prepared from low-quality potatoes, following the conventional process illustrated in Table I. The fried chips had very dark spots, they tasted burnt and overall were unacceptable. Sample 2 was prepared from the same low-quality potatoes. The residence time in the hot blancher was too short to remove sufficient sugar. The resulting chips were dark and unacceptable. Sample 5 was a control product and the chips were prepared from excellent quality potatoes. The resulting fried chips had light golden color, excellent taste and were crisp. Overall such chips were of very good quality. The chips of Sample 3 were of excellent quality and comparable to those of Sample 5. Sample 4 provided good chips of a quality comparable to those of Sample 5. This example shows that quality potato chips can be prepared from low-quality potatoes by use of the hot blanching to remove a major portion of sugar yet avoiding rupture of the starch granules which results in a rubbery chip texture.

EXAMPLE III

The present invention was carried out as described in Example 1 using Menona potato chips. These chips had a high sugar level. The following Table II sets forth the conditions under which chips were fried from such Menona potatoes. Sample 6 follows the conventional processing of potato chips in which they are sliced and cooked in oil without the blanching of the present invention. Samples 7 and 8 were blanched.

Sample 6 resulted in potato chips which had color mixed from dark to light. The color was unacceptable. The chips tasted slightly burnt. Overall such chips were considered to be unacceptable. Sample 7 resulted in chips that were considered to be of good quality. The chips were slightly rubbery due to rupturing of some starch cells. Overall the chips were considered to be marginably acceptable. Sample 8 resulted in chips having a satisfactory, light color, an acceptable taste and overall considered to be an acceptable quality product.

EXAMPLE IV

The present invention was carried out using Norchip potatoes which had been stored at 43° F. These chips had a high sugar level and were unacceptable when used to prepare chips following conventional fried potato chip processing. The following Table III illustrates the conditions under which the various chips were prepared. Sample 9 was the control and was prepared from high-quality Norchip potatoes having a low sugar content suitable for use in conventional fried potato chip processes. Samples 10–19 were prepared from Norchip potatoes that had been stored at 43° F. Such potatoes had a high sugar content and were not suitable for conventional fried potato chip processes as illustrated by Sample 10. The following Table III illustrates the condition under which the various samples were prepared.

TABLE II

| Sample No. | Type of Potato | Hot Blancher | | Cold Blancher | | Cooking Oil | |
|---|---|---|---|---|---|---|---|
| | | Immersion Time (Min) | Water Temp (°F.) | Immersion Time (Min) | Water Temp (°F.) | Immersion Time (Sec) | Oil Temp (°F.) |
| 6 | Menona | — | — | — | — | 90 | 358 |
| 7 | Menona | 3.5 | 158 | — | — | 90 | 358 |
| 8 | Menona | 2.5 | 158 | — | — | 90 | 358 |

TABLE III

| Sample No. | Type of Potato | Hot Blancher | | Cold Blancher | | Cooking Oil | |
|---|---|---|---|---|---|---|---|
| | | Immersion Time (Min) | Water Temp (°F.) | Immersion Time (Min) | Water Temp (°F.) | Immersion Time (Sec) | Oil Temp (°F.) |
| 9 | Norchip Good Quality Low Sugar | 0.0 | — | 0.0 | — | 100 | 360 |
| 10 | Norchip Low Quality High Sugar | 0.0 | — | 0.0 | — | 92 | 360 |
| 11 | Norchip Low Quality High Sugar | 1.0 | 163 | 0.0 | — | 85 | 365 |
| 12 | Norchip Low Quality High Sugar | 1.0 | 163 | 1.0 | 40 | 85 | 365 |
| 13 | Norchip Low Quality High Sugar | 2.0 | 163 | 0.0 | — | 85 | 365 |
| 14 | Norchip | 2.0 | 163 | 1.0 | 40 | 85 | 365 |

TABLE III-continued

| Sample No. | Type of Potato | Hot Blancher Immersion Time (Min) | Hot Blancher Water Temp (°F.) | Cold Blancher Immersion Time (Min) | Cold Blancher Water Temp (°F.) | Cooking Oil Immersion Time (Sec) | Cooking Oil Oil Temp (°F.) |
|---|---|---|---|---|---|---|---|
| 15 | Low Quality High Sugar Norchip | 3.0 | 161 | 0.0 | — | 85 | 365 |
| 16 | Low Quality High Sugar Norchip | 3.0 | 161 | 1.0 | 40 | 85 | 365 |
| 17 | Low Quality High Sugar Norchip | 4.0 | 163 | 0.0 | — | 85 | 365 |
| 18 | Low Quality High Sugar Norchip | 2.5 | 162 | 1.0 | 40 | 85 | 365 |
| 19 | Low Quality High Sugar Norchip | 2.0 | 162 | 1.0 | 40 | 85 | 365 |

Sample 9 resulted in excellent potato chips and was used as a standard against which the various other samples in this example were compared. Sample 10 utilized the high-sugar Norchip potatoes and followed conventional potato chip processing. The resulting chips were dark in color, tasted burnt and were considered unacceptable as a potato chip product. Sample 11 substantially followed the present invention; however, the residence time in the hot blancher and the fact that the potato slices were not put through the cold blancher resulted in potato slices with sugar content too high to provide satisfactory fried chips. The resulting chips were dark in color, tasted slightly burnt and were overall considered to be unacceptable. Sample 12 was processed according to the present invention and included processing through the cold blancher. The combination of the hot blancher and cold blancher was sufficient to remove sugar to a level that a marginally acceptable product resulted. The color was not as good as Sample 9. There was a slightly burnt flavor to the chips. Overall, the chips were considered to be marginally acceptable. Sample 13 was processed according to the present invention, except the residence time in the hot blancher was insufficient to remove enough sugar to provide acceptable fried chips. The resulting color was too dark and tasted slightly burnt. Overall, the product was considered to be unacceptable. Sample 14 was prepared according to the present invention, including processing both through the hot blancher and the cold blancher. The resulting fried chips had color that was considered to be good and the taste was considered to be good. The quality of the product closely approximated Sample 9. Sample 15 included processing the potato slices through the hot blancher but did not include the cold blanching step. Sufficient sugar was removed. The color was considered to be good, although bleached spots were starting to appear. The taste of the product was acceptable but was not as good as Sample 14. Sample 16 included processing both in the hot blancher and the cold blancher. The color was considered to be good. The fried chips had begun to lose flavor and become somewhat bland. The overall quality of the chip was considered to be marginal. Sample 17 was processed only in the hot blancher. The color was considered to be acceptable; although, some bleached spots began to appear. The overall quality of the fried chip was considered to be acceptable but marginal. Sample 18 included processing both in the hot blancher and in the cold blancher. The color was considered to be excellent. The quality of the product was equal to Sample 9. In fact, the resulting chip could not be distinguished from Sample 9. Sample 19 included processing both in the hot blancher and in the cold blancher. The resulting chips were considered to be excellent. They were slightly lighter in color than Sample 9; although a quality difference could not be distinguished between the two chips.

I claim:

1. A process for preparing potato chips from potatoes having an elevated sugar content, said process comprising slicing said potatoes to a thickness of between about 0.05 and 0.075 inches, the sugar content of said slices being sufficiently high to result in unsatisfactory potato chips upon conventional potato chip frying, immersing said potato slices in a hot water bath for a period of time sufficient to remove at least 50% of the surface sugar in said slice, adjusting the temperature of said water and the residence time in said bath below the point at which significant starch granule rupture occurs, said time and temperature being high enough to provide sugar removal from the surfaces of said slices sufficient to result in light colored fried potato chips, frying said slices in hot oil to provide potato chips having a uniform light golden color.

2. The process of claim 1 wherein said slices are cooled to less than about 80° F. prior to frying.

3. The process of claim 1 wherein said bath is at a temperature of between about 150° and 170° F.

4. The process of claim 3 wherein said starch granule rupture is less than 5% of the starch granules exposed on the surface of each said slice.

5. The process of claim 1 wherein step (b) removes about 50–90 wt-% of the total sugar present in the potato slices.

6. The process of claim 1 wherein the number percent of ruptured starch cells is determined about every 20 to 60 minutes.

7. The process of claim 1 wherein the number percent of ruptured starch cells is determined by visually examining a magnified portion of a potato slice between steps (a) and (b)

8. The process of claim 1 wherein the concentration of dissolved solids in the heated water is maintained below about 3 wt-%.

9. A process for making fried potato chips, comprising the steps of:

(a) slicing potatoes into slices of sufficient size to make potato chips from the slices;
(b) contacting the potato slices with water heated to about 150°–170° F. for about 0.5–3 minutes so as to remove sugar from the potato slices and retain structural integrity of substantially all starch cells present in the potato slices, periodically determining the percentage of starch cells ruptured and adjusting the temperature of the water and/or adusting the duration of contact between the potato slices and the water accordingly;
(c) after step (b), cooling the potato slices to less than about 80° F.; and
(d) after step (c), cooking the potato slices in oil heated to about 350°–385° F. for about 1–5 minutes to make potato chips.

10. The process of claim 9 wherein step (b) removes about 50–90 wt-% of the total sugar present in the potato slices.

11. The process of claim 9 wherein step (b) ruptures less than 5% of the total number of starch cells present in the potato slices.

12. The process of claim 9 wherein the potato slices are cooled in step (c) by contacting the potato slices with water maintained at less than about 80° F.

13. The process of claim 9 wherein the concentration of dissolved solids in the water used in steps (b) and (c) is maintained below about 3 wt-%.

14. A continuous process for making blanched potato chips, comprising the steps of:
(a) slicing potatoes into slices of sufficient size to make potato chips;
(b) immersing the potato slices into water heated to about 150°–170° F. for about 0.5–3 minutes so as to remove about 50–90 wt-% of the total sugar present in the potato slices while retaining the structural integrity of at least 95% of the total number of starch cells present in the potato slices;
(c) determining, about every 20–60 minutes, the number percent of starch cells ruptured during step (b) and adjusting the temperature of the water used in step (b) or adjusting the duration of contact between the potato slices and the water in step (b) accordingly;
(d) after step (c), immersing the potato slices in water maintained at less than about 80° F. at least until the potato slices reach a temperature of less than about 80° F.; and
(e) cooking the potato slices in oil heated to about 350°–385° F. for about 1–5 minutes to make potato chips.

15. A continuous process for preparing potato chips comprising the steps of:
(a) immersing potato slices in water heated to about 150°–170° F. for about 0.5–3 minutes so as to remove about 50–90 wt-% of the total sugar present in the potato slices while retaining the structural integrity of at least 95% of the total number of starch cells present in the potato slices;
(b) determining, about every 20–60 minutes, the number percent of starch cells ruptured during step (a) and adjusting the temperature of the water used in step (a) or adjusting the duration of contact between the potato slices and the water used in step (a) accordingly;
(c) cooling the potato slices heated in step (a) by immersing the potato slices in water maintained at less than about 80° F. at least until the potato slices reach a temperature of less than about 80° F.;
(d) maintaining the concentration of dissolved solids in the water used in steps (a) and (c) below about 3 wt-%;
(e) and frying the potato slices to form potato chips.

* * * * *